United States Patent
Kim et al.

(10) Patent No.: US 9,100,674 B2
(45) Date of Patent: Aug. 4, 2015

(54) METHOD AND APPARATUS FOR DISTRIBUTING VIDEO UNDER MULTI-CHANNEL, AND VIDEO MANAGEMENT SYSTEM USING THE SAME

(75) Inventors: Jong Wan Kim, Suwon-si (KR); Sang Jin Lee, Yeonsu-gu (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 13/426,237

(22) Filed: Mar. 21, 2012

(65) Prior Publication Data

US 2013/0074140 A1    Mar. 21, 2013

(30) Foreign Application Priority Data

Jul. 28, 2011    (KR) .......................... 10-2011-0075291

(51) Int. Cl.
| | |
|---|---|
| *H04N 7/173* | (2011.01) |
| *H04N 21/2383* | (2011.01) |
| *H04N 21/233* | (2011.01) |
| *H04N 21/2343* | (2011.01) |
| *H04N 21/2381* | (2011.01) |
| *H04N 21/439* | (2011.01) |
| *H04N 21/44* | (2011.01) |

(52) U.S. Cl.
CPC ....... *H04N 21/2383* (2013.01); *H04N 21/2335* (2013.01); *H04N 21/2343* (2013.01); *H04N 21/2381* (2013.01); *H04N 21/4394* (2013.01); *H04N 21/44008* (2013.01)

(58) Field of Classification Search
USPC .................................. 725/115, 116, 117, 119
See application file for complete search history.

(56) References Cited

U.S. PATENT DOCUMENTS

| | | | |
|---|---|---|---|
| 8,087,047 B2* | 12/2011 | Olague et al. .................... 725/39 |
| 2010/0192190 A1* | 7/2010 | Savoor et al. ................. 725/109 |
| 2011/0072479 A1* | 3/2011 | Hsu et al. ....................... 725/110 |
| 2011/0119716 A1* | 5/2011 | Coleman, Sr. .................. 725/62 |
| 2011/0302332 A1* | 12/2011 | Soeda et al. .................... 710/18 |
| 2012/0192225 A1* | 7/2012 | Harwell et al. ................. 725/34 |

FOREIGN PATENT DOCUMENTS

| | | |
|---|---|---|
| JP | 2008-193732 | 8/2008 |
| KR | 10-20070015724 A | 6/2007 |
| KR | 1020080082689 A | 12/2008 |
| KR | 10-0932157 | 10/2009 |
| KR | 2010-009303 | 9/2010 |
| KR | 1020090054715 A | 12/2010 |

* cited by examiner

*Primary Examiner* — Nnenna Ekpo

(74) *Attorney, Agent, or Firm* — Keohane & D'Alessandro PLLC; Madeline F. Schiesser

(57) ABSTRACT

The present disclosure provides a multi-channel video distribution method and apparatus, and a video management system using the same, including a client system to communicate with a standardized video providing apparatus or a non-standardized video providing apparatus, and to receive a video/sound signal from the standardized video providing apparatus or the non-standardized video providing apparatus; a transcode system to convert the video/sound signal, received by the client system, to a video/sound format that is requested in a client application; and a server system to communicate with the client application, and to transmit, to the client application, the video/sound signal that is converted by the transcode system.

18 Claims, 7 Drawing Sheets

<PRIOR ART>

METHOD AND APPARATUS FOR DISTRIBUTING VIDEO UNDER MULTI-CHANNEL, AND VIDEO MANAGEMENT SYSTEM USING THE SAME

CROSS-REFERENCE TO RELATED APPLICATIONS

This application is based on and claims priority under 35 U.S.C. §119 from Korean Patent Application No. 10-2011-0075291, filed on Jul. 28, 2011, with the Korean Intellectual Property Office, the disclosure of which is incorporated herein in its entirety by reference.

TECHNICAL FIELD

The present disclosure relates to a video management system, and more particularly, to a multi-channel video distribution method and apparatus that may receive video/sound signals from standardized video providing apparatuses or non-standardized video providing apparatus of various companies and convert the received video/sound signals to a standardized output format.

BACKGROUND

Recently, in places, such as banks, government offices, group houses, and the like, that require high security and need to centrally and intensively manage a large area, there is an increasing necessity of a video management system to prevent the occurrence of an incident such as a criminal act or a state of emergency and to verify circumstances of an incident if an incident occurs.

FIG. 1 is a diagram illustrating a schematic configuration of a video management system according to a related art.

As shown in FIG. 1, the video management system in the related art includes at least one closed-circuit television (CCTV) camera 110 installed in remote places that are required to be monitored, a video distribution apparatus 120 connected to each CCTV camera 110 in a wired manner, and a client application 130 connected to the video distribution apparatus 120 over a communication network.

The CCTV camera 110 transfers an obtained video/sound signal to the video distribution apparatus 120 through a wired cable, and the video distribution apparatus 120 transmits the received video/sound signal to the client application 130 over the communication network.

The client application 130 is connected to the video distribution apparatus 120 to perform search and playback of various types of video/sound signals stored in the video distribution apparatus 120, and controls an operation of the video distribution apparatus 120 in a remote place using various types of control signals. In addition, the client application 130 may directly request the CCTV camera 110, which the client application 130 desires to manage, for streaming and thereby receive a sound/video signal obtained by the CCTV camera 110.

However, when a different type of CCTV camera is added in the video management system of the related art, all of client applications need to be corrected since a streaming scheme is different for each company. Further, a video/audio codec used for each company is different. Therefore, unless a dedicated application is assigned for each company, the added CCTV camera may not be readily compatible with the existing CCTV cameras.

In addition, in the video management system of the related art, the client application causes the waste of bandwidth by individually requesting each CCTV camera for streaming, and when a size of a received video is not a size desired by each client application, the received video is converted to a size required in an application end whereby load occurs in the client application.

Moreover, a storage storing video signals uses a different scheme for each company, which may become a single problematic factor in unifying a system. In addition, two folds of bandwidth are used for storing video signals and thus, system resources may be wasted.

SUMMARY

The present disclosure has been made in an effort to provide a multi-channel video distribution method and apparatus that may maintain the existing compatibility even though a different type of a video providing apparatus is added, and a video management system using the same.

The present disclosure has been made in an effort to provide a multi-channel video distribution method and apparatus that may maintain the compatibility with respect to a codec, which is different for each company, while not employing additional correction of a client application but using the existing client application, and a video management system using the same.

The present disclosure has been made in an effort to provide a multi-channel video distribution method and apparatus that may minimize the unnecessary waste of bandwidth, and a video management system using the same.

The present disclosure has been made in an effort to provide a multi-channel video distribution method and apparatus that may readily perform expansion and compatibility with another system by unifying a storage, and a video management system using the same.

An exemplary embodiment of the present disclosure provides a multi-channel video distribution apparatus, including: a client system to communicate with a standardized video providing apparatus or a non-standardized video providing apparatus, and to receive a video/sound signal from the standardized video providing apparatus or the non-standardized video providing apparatus; a transcode system to convert the video/sound signal, received by the client system, to a video/sound format that is requested in a client application; and a server system to communicate with the client application, and to transmit, to the client application, the video/sound signal that is converted by the transcode system.

Another exemplary embodiment of the present disclosure provides a multi-channel video distribution method, including: communicating, by a client system, with a standardized video providing apparatus or a non-standardized video providing apparatus; receiving, by the client system, a video/sound signal from the standardized video providing apparatus or the non-standardized video providing apparatus; converting, by a transcode system, the video/sound signal, received by the client system, to a video/sound format that is requested in a client application; and transmitting, by a server system, to the client application, the video/sound signal that is converted by the transcode system.

Yet another exemplary embodiment of the present disclosure provides a video management system, including: a video providing apparatus including at least one of a standardized video providing apparatus and a non-standardized video providing apparatus; at least one client application to request a video photographed by the video providing apparatus; and a multi-channel video distribution apparatus to communicate with the video providing apparatus, to convert a video/sound signal, received from the video providing apparatus, to a video/sound format that is requested in the client application, and to thereby transmit the converted video/sound signal to the client application.

According to the exemplary embodiments of the present disclosure, there is provided a multi-channel video distribution apparatus installed with an application programming interface (API) for each company. Therefore, the compatibility with a different type of product is maintained and a video management system is readily modified.

According to the exemplary embodiments of the present disclosure, there are provided a multi-channel video distribution method and apparatus for converting a codec different for each company to a standard format. Therefore, a product applied with a standard client application that follows an open network video interface forum (ONVIF) standard is compatible regardless of a manufacturer of the product.

According to the exemplary embodiments of the present disclosure, there are provided a multi-channel video distribution method and apparatus for resizing a video size to be suitable for each client application. Therefore, it is possible to prevent the unnecessary waste of bandwidth and to expand the bandwidth to a broadband wider than an existing management scale.

According to the exemplary embodiments of the present disclosure, there are provided a multi-channel video distribution method and apparatus for streaming a video/sound signal stored in a storage via a storage interface. Therefore, a separate additional apparatus for storing the video/sound signal is not required.

According to the exemplary embodiments of the present disclosure, there are provided a video distribution method and apparatus including an analytics function. Therefore, it is possible to decrease load in a client application.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In the present disclosure, an open network video interface (ONVIF) protocol indicates a standard protocol designated by an "ONVIF", working on a network video security equipment and international standard, in order to solve a protocol incompatibility issue of an Internet protocol (IP) camera.

In the exemplary embodiments of the present disclosure, a standardized video providing apparatus or a standardized client application refers to an apparatus that follows the ONVIF protocol, and a non-standardized video providing apparatus or a non-standardized client application refers to an apparatus that does not follow the ONVIF protocol.

Figure 1:
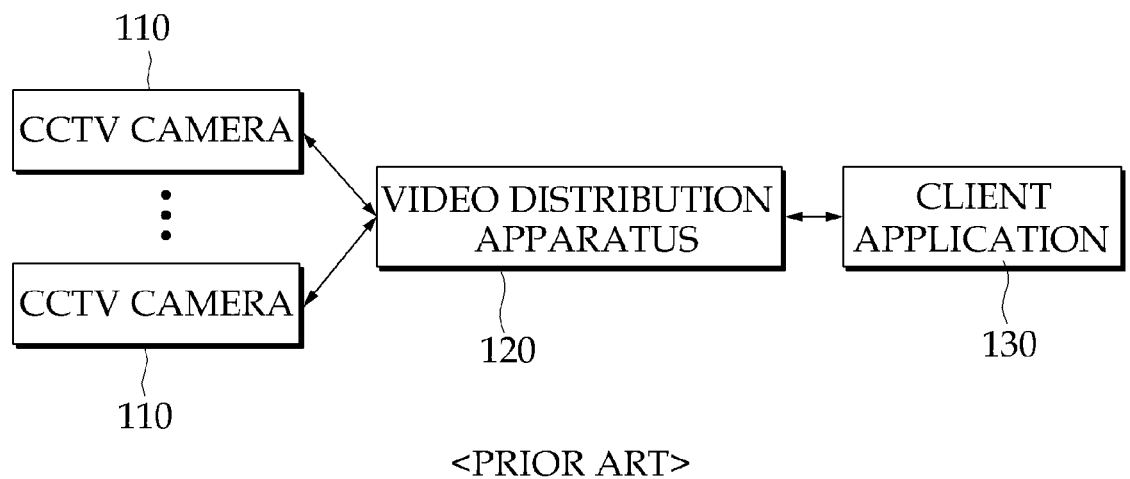
FIG. 1 is a diagram illustrating a schematic configuration of a video management system according to a related art.
Figure 2:
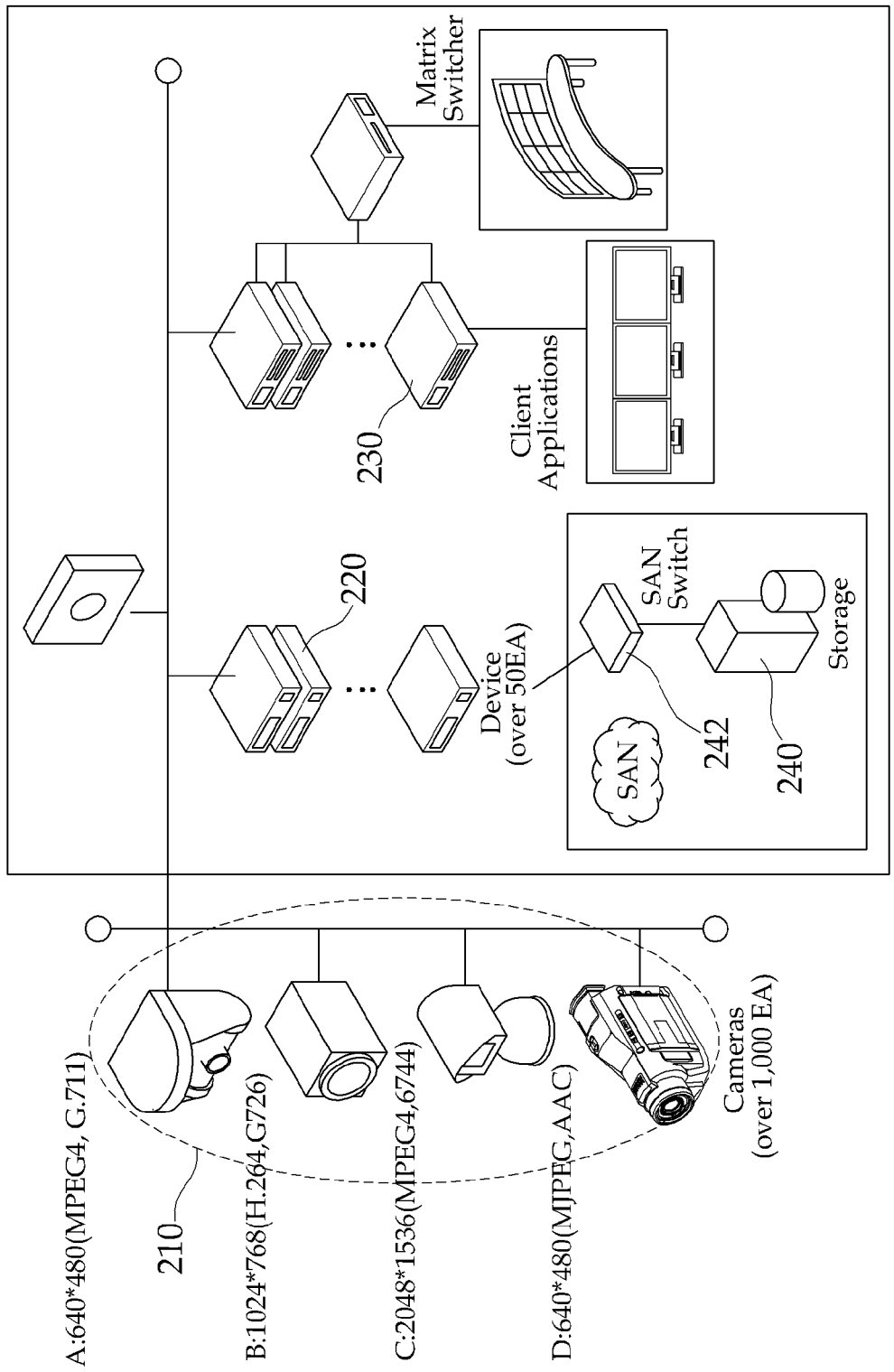
FIG. 2 is a diagram illustrating a configuration of a video management system according to an exemplary embodiment of the present disclosure.

FIG. 2 is a diagram illustrating a configuration of a video management system 200 according to an exemplary embodiment of the present disclosure.

Referring to FIG. 2, the video management system 200 according to the present disclosure includes at least one video providing apparatus 210, a multi-channel video distribution apparatus 220, at least one client application 230, and the like.

The video providing apparatus 210 includes a standardized video providing apparatus or a non-standardized video providing apparatus, and converts a provided/photographed video to a video/sound (i.e., audio/visual (A/V)) signal. Here, the video providing apparatus 210 may be a surveillance camera, a broadcasting server providing a broadcasting service, a content providing server providing video content, and the like.

The multi-channel video distribution apparatus 220 communicates with the video providing apparatus 210, converts the video/sound signal, received from the video providing apparatus 210, to a video/sound format that is requested in the client application 230, and then transmits the converted video/sound signal to the client application 230. Here, the multi-channel video distribution apparatus 220 communicates with the non-standardized video providing apparatus via an application programming interface (API).

When the client application 230 is a non-standardized client application, the multi-channel video distribution apparatus 220 provides the client application 230 with a service address for providing the video/sound signal that is requested in the client application 230. Here, the multi-channel video distribution apparatus 220 provides the client application 230 with a different service address based on a protocol scheme with the client application 230, and a video providing apparatus and a video/sound format that are requested in the client application 230.

The multi-channel video distribution apparatus 220 may store, in a storage 240 as a file format, the video/sound signal received from the video providing apparatus 210, or may convert, to a streaming, the video/sound signal that is stored in the storage 240 and thereby transmit the converted video/sound signal to the client application 230 in response to a request of the client application 230.

The multi-channel video distribution apparatus 220 may detect an event from the video/sound signal received from the video providing apparatus 210 using a predetermined detection algorithm, and may transmit the detected event to the client application 230.

Similar to the video providing apparatus 210, the client application 230 may be a standardized client application or a non-standardized client application. The client application 230 may be connected to the multi-channel video distribution apparatus 220 to request a video of a desired video providing apparatus and to receive a video/sound signal of the corresponding video providing apparatus over the multi-channel video distribution apparatus 220. Here, the client application 230 may request a video of the video providing apparatus 210 by setting various resolutions based on the video/sound format and the screen segmentation.

Figure 3:
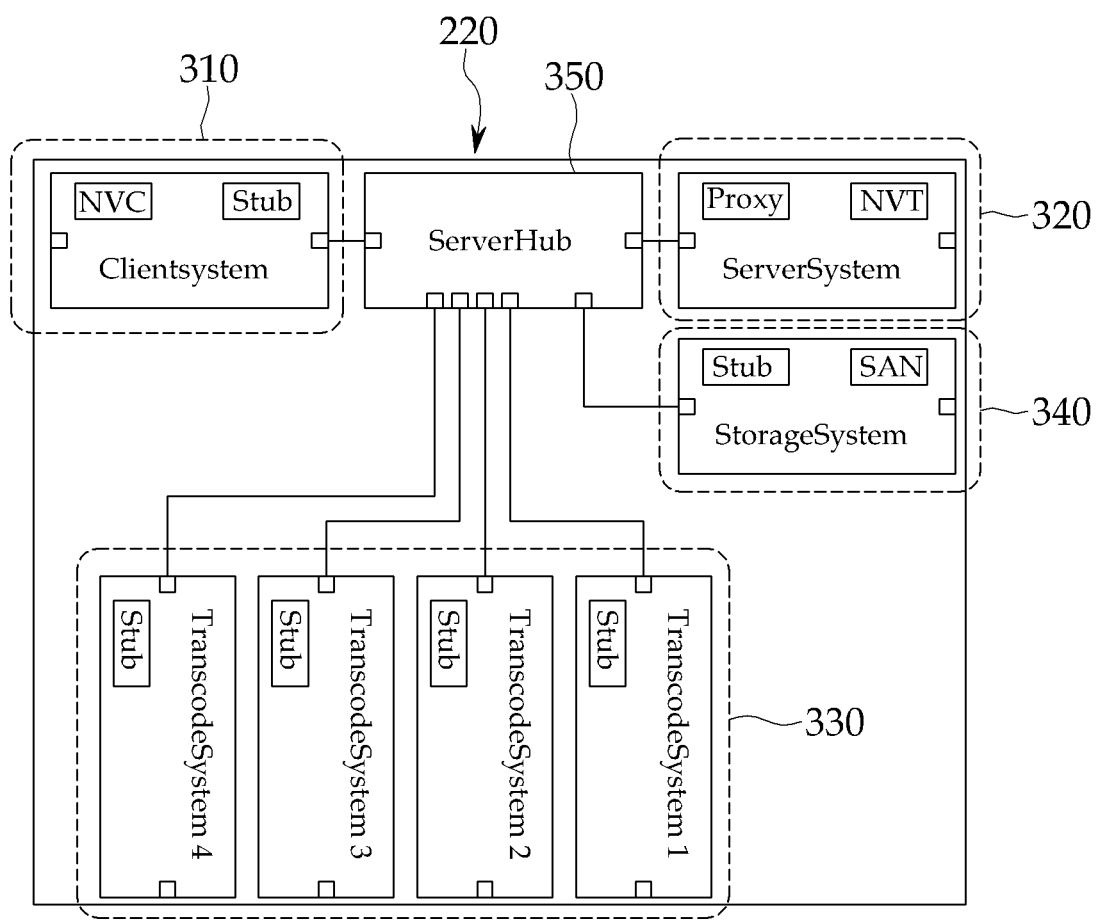
FIG. 3 is a block diagram illustrating a schematic internal configuration of a multi-channel video distribution apparatus according to an exemplary embodiment of the present disclosure.

FIG. 3 is a block diagram illustrating a schematic internal configuration of the multi-channel video distribution apparatus 220 according to an exemplary embodiment of the present disclosure.

Referring to FIG. 3, the multi-channel video distribution apparatus 220 according to the present disclosure includes a client system 310, a server system 320, a transcode system 330, a storage system 340, a server hub 350, and the like.

The client system 310 communicates with a standardized video providing apparatus or a non-standardized video providing apparatus, and receives a video/sound signal from the video providing apparatus 210. Here, the client system 310 communicates with the non-standardized video providing apparatus via an API.

The server system 320 communicates with the client application 230, and transmits, to the client application 230, the video/sound signal converted by the transcode system 330 in response to a request of the client application 230. Here, when the client application 230 is a non-standardized client application, the server system 320 provides the client application 230 with a service address for providing the video/sound signal requested in the client application 230 and thereby transmits, to the client application 230, the video/sound signal converted by the transcode system 330.

In response to a request of an operating terminal (not shown), the server system 320 performs setting and control of the multi-channel video distribution apparatus 220. Specifically, in response to the request of the operating terminal, the server system 320 may set an IP address of the video providing apparatus 210, an IP address of the multi-channel video distribution apparatus 220, an IP address of an input/output end, a video conversion scheme, and the like.

The transcode system 330 converts the video/sound signal, received from the video providing apparatus 210 over the client system 310, to the video/sound format that is requested in the client application 230. Here, the transcode system 330 may transmit the converted video/sound signal to the client application 230 over the server system 320, or may directly transmit the converted video/sound signal to the client application 230. Accordingly, it is possible to prevent load from occurring in the server system 320 due to excessive data transmission.

The transcode system 330 may detect an event from the video/sound signal received from the video providing apparatus 210 using a predetermined detection algorithm such as motion recognition, video recognition, and the like, and may transmit the detected event to the client application 230.

The storage system 340 stores, in the storage 240 as a file format, the video/sound signal that is received from the video providing apparatus 210, or reads the video/sound signal stored in the storage 240. Here, the storage 240 may be a storage such as a storage area network (SAN), a network attached storage (NAS), and the like, and is connected to the storage system 340 via an external switch 242.

The storage system 340 may store a list of video/sound signals stored in the storage 240, and may provide the list to the client application 230 when a request of the client application 230 is received.

The server hub 350 functions to maintain a transmission control protocol/Internet protocol (TCP/IP) connection within the multi-channel video distribution apparatus 220 and to perform switching between apparatuses within the multi-channel video distribution apparatus 220.

Figure 4:
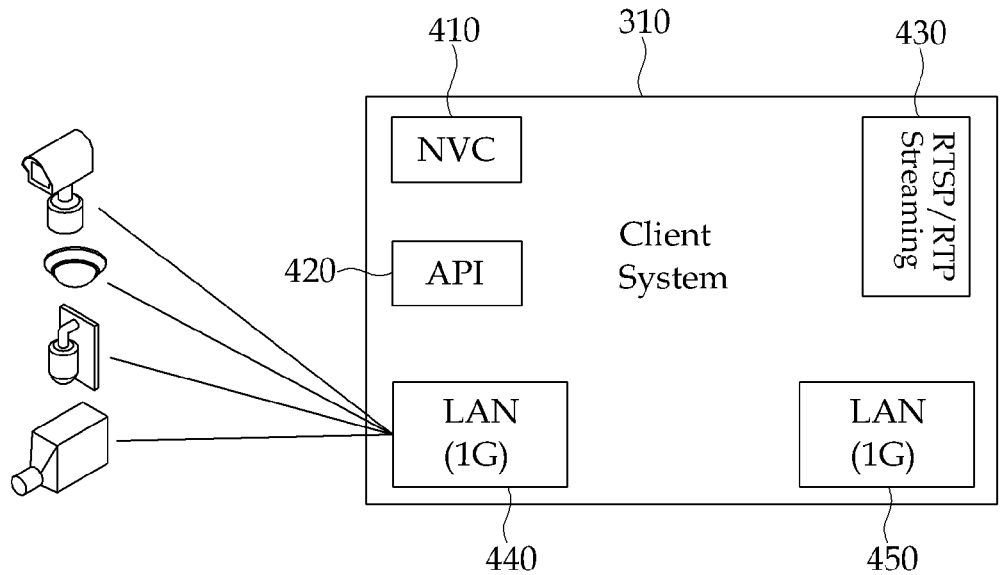
FIG. 4 is a block diagram illustrating a schematic internal configuration of a client system according to an exemplary embodiment of the present disclosure.

FIG. 4 is a block diagram illustrating a schematic internal configuration of the client system 310 according to an exemplary embodiment of the present disclosure.

Referring to FIG. 4, the client system 310 according to the present disclosure includes a network video client (NVC) module 410, an API module 420, a streaming (real time streaming protocol/real time transport protocol (RTSP/RTP) streaming) module 430, local area network (LAN) modules 440 and 450, and the like.

The NVC module 410 is a standard client module defined in the ONVIF and functions to communicate with a standardized video providing apparatus that follows the ONVIF standard.

The API module 420 includes an API that supports a variety of protocols including a transmission control protocol (TCP), a user datagram protocol (UDP), an RTP, a real-time transport control protocol (RTCP), an RTSP, and the like, and functions to communicate with the non-standardized video providing apparatus via the API. Accordingly, a video providing apparatus of a new company may be easily added via the API.

The streaming module 430 functions to transmit, to the inside using a predetermined protocol, a video that is received using a protocol different for each company. Specifically, the streaming module 430 transmits, to the inside using an RTSP/RTP protocol, the video that is received using the protocol different for each company.

The LAN modules 440 and 450 include an input end 440 that is connected to the video providing apparatus 210 and an output end 450 that is connected to an internal apparatus. The LAN modules 440 and 450 may be used and expanded in various networks due to a free IP setting.

Figure 5:
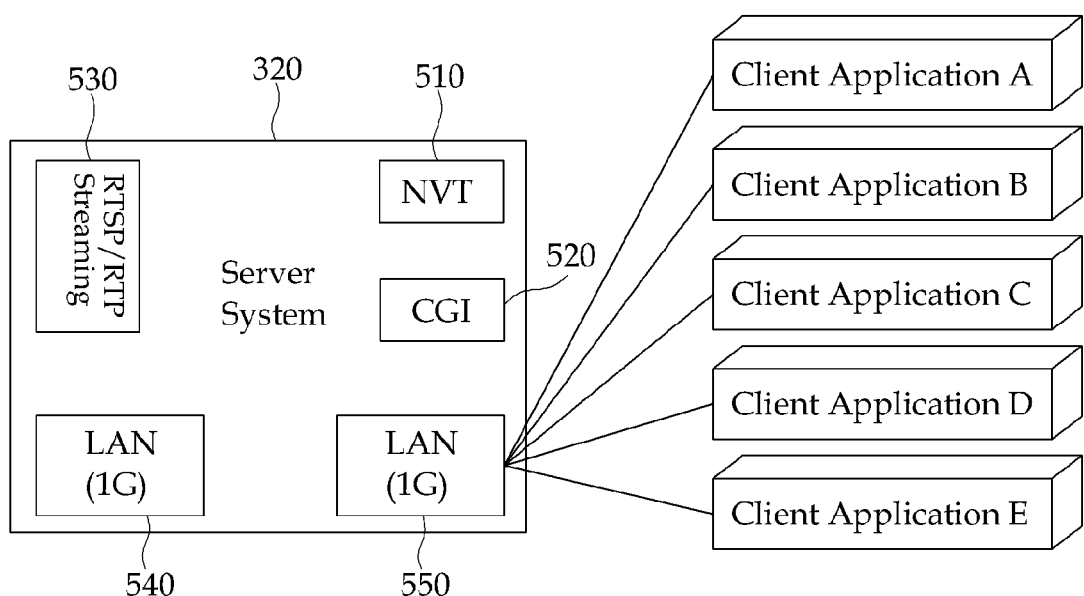
FIG. 5 is a block diagram illustrating a schematic internal configuration of a server system according to an exemplary embodiment of the present disclosure.

FIG. 5 is a block diagram illustrating a schematic internal configuration of the server system 320 according to an exemplary embodiment of the present disclosure.

Referring to FIG. 5, the server system 320 according to the present disclosure includes a network video transmitter (NVT) module 510, a common gateway interface (CGI) module 520, a streaming (RTSP/RTP streaming) module 530, LAN modules 540 and 550, and the like.

The NVT module 510 performs a functionality of a server that follows the ONVIF standard, and communicates with the client application 230 to thereby perform a video/sound setting and other settings (for example, an IP address, and the like). The NVT module 510 performs a functionality of an event server that processes an internally occurring event (for example, preparation, suspension, and the like of the video providing apparatus 210), and transmits the occurring event to the client application 230.

The CGI module 520 functions to set and control the multi-channel video distribution apparatus 220 (FIG. 3) in response to a command of the operating terminal. Specifically, in response to the command of the operating terminal, the CGI module 520 sets an IP address of the video providing apparatus 210, an IP address of the multi-channel video distribution apparatus 220 (FIG. 2), an IP address of input/output ends, a video conversion scheme, and the like.

The streaming module 530 transmits the video/sound signal to the client application 230 to be suitable for the protocol of the client application 230.

The LAN modules 540 and 550 include an input end 540 that is connected to an internal apparatus and an output end 550 that is connected to the client application 230. The LAN modules 540 and 550 may be used and expanded in various networks due to a free IP setting.

Figure 6:
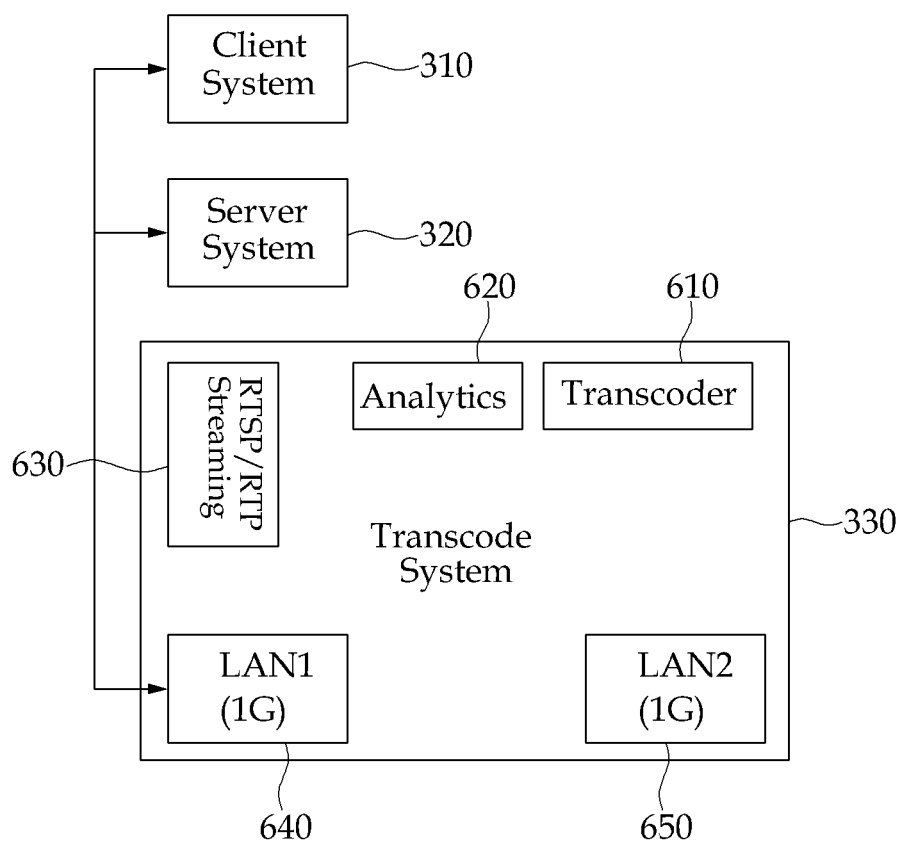
FIG. 6 is a block diagram illustrating a schematic internal configuration of a transcode system according to an exemplary embodiment of the present disclosure.

FIG. 6 is a block diagram illustrating a schematic internal configuration of the transcode system 330 according to an exemplary embodiment of the present disclosure.

Referring to FIG. 6, the transcode system 330 according to the present disclosure includes a transcoder module 610, an analytics module 620, a streaming (RTSP/RTP streaming) module 630, LAN modules 640 and 650, and the like.

The transcoder module 610 converts a video/sound signal, received from the video providing apparatus 210 over the client system 310, to a video/sound format that is requested in the client application 230. In response to a request of the client application 230, the transcoder module 610 may change a resolution of the video/sound signal received from the video providing apparatus 210.

The analytics module 620 detects an event from the video/sound signal received from the video providing apparatus 210 (FIG. 2) using a predetermined detection algorithm such as motion recognition, video recognition, and the like, and transmits the detected event to the client application 230 (FIG. 3). Therefore, the multi-channel video distribution apparatus 220 according to the present disclosure may perform monitoring of a loiterer, detecting of an intruder, facial recognition, and the like.

The streaming module 630 may transmit, to the server system 320 through an input end 640, the video/sound signal converted by the transcoder module 610 and thereby transmit the converted video/sound signal to the client application 230, or may directly transmit, to the client application 230 through an output end 650, the video/sound signal that is converted by the transcoder module 610.

The LAN modules 640 and 650 include the input end 640 that is connected to an internal apparatus and the output end 650 that is connected to the client application 230. The LAN modules 640 and 650 may be used and expanded in various networks due to a free IP setting.

Figure 7:
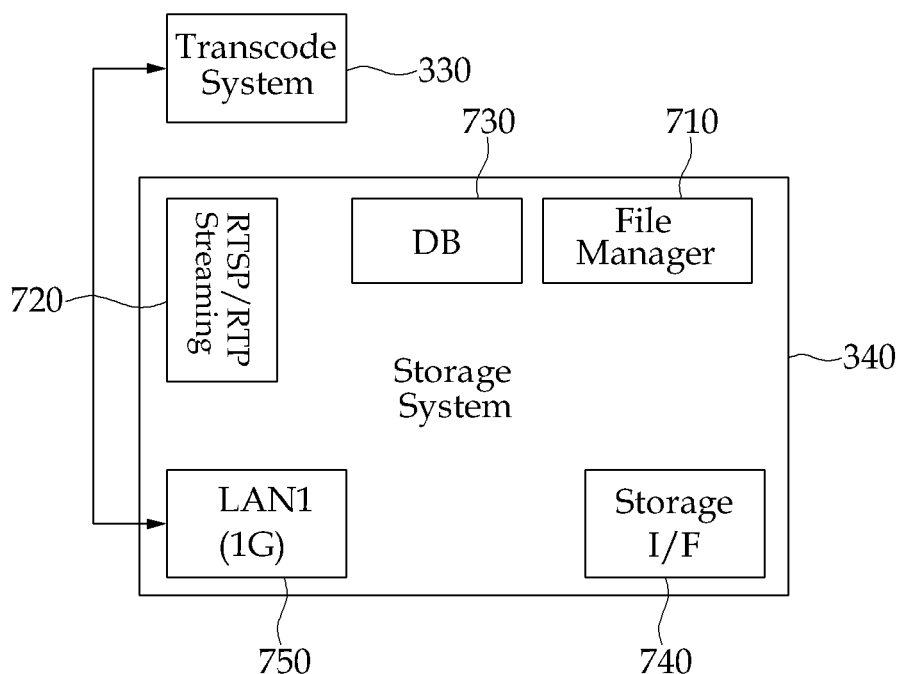
FIG. 7 is a block diagram illustrating a schematic internal configuration of a storage system according to an exemplary embodiment of the present disclosure.

FIG. 7 is a block diagram illustrating a schematic internal configuration of the storage system 340 according to an exemplary embodiment of the present disclosure.

Referring to FIG. 7, the storage system 340 according to the present disclosure includes a file manager module 710, a streaming (RTSP/RTP streaming) module 720, a database (DB) module 730, a storage interface (I/F) module 740, a LAN module 750, and the like.

The file manager module 710 functions to store, in the storage 240 (FIG. 2) such as a SAN or a NAS as a file format, a video/sound signal received from the video providing apparatus 210, or to read the video/sound signal stored in the storage 240. Here, the file manager module 710 extracts a header from the video/sound signal received from the video providing apparatus 210 (FIG. 2), and stores the received video/sound signal as a file format for each date and each time.

The streaming module 720 converts, to a streaming, the video/sound signal that is read from the storage 240, and transmits the converted video/sound signal to the transcode system 330.

The DB module 730 manages a list of video/sound signals stored in the storage 240, as a DB, and provides the DB when a request of the client application 230 is received.

The storage I/F module 740 is connected to the external switch 242 (FIG. 2) to mount a file system from the storage 240 and thereby enable a read/write function. Here, the storage I/F module 740 may be a SAN I/F module or a NAS I/F module according to a type of the storage 240.

The LAN module 750 is connected to an internal apparatus. The LAN module 750 may be used and expanded in various networks due to a free IP setting.

Figure 8:
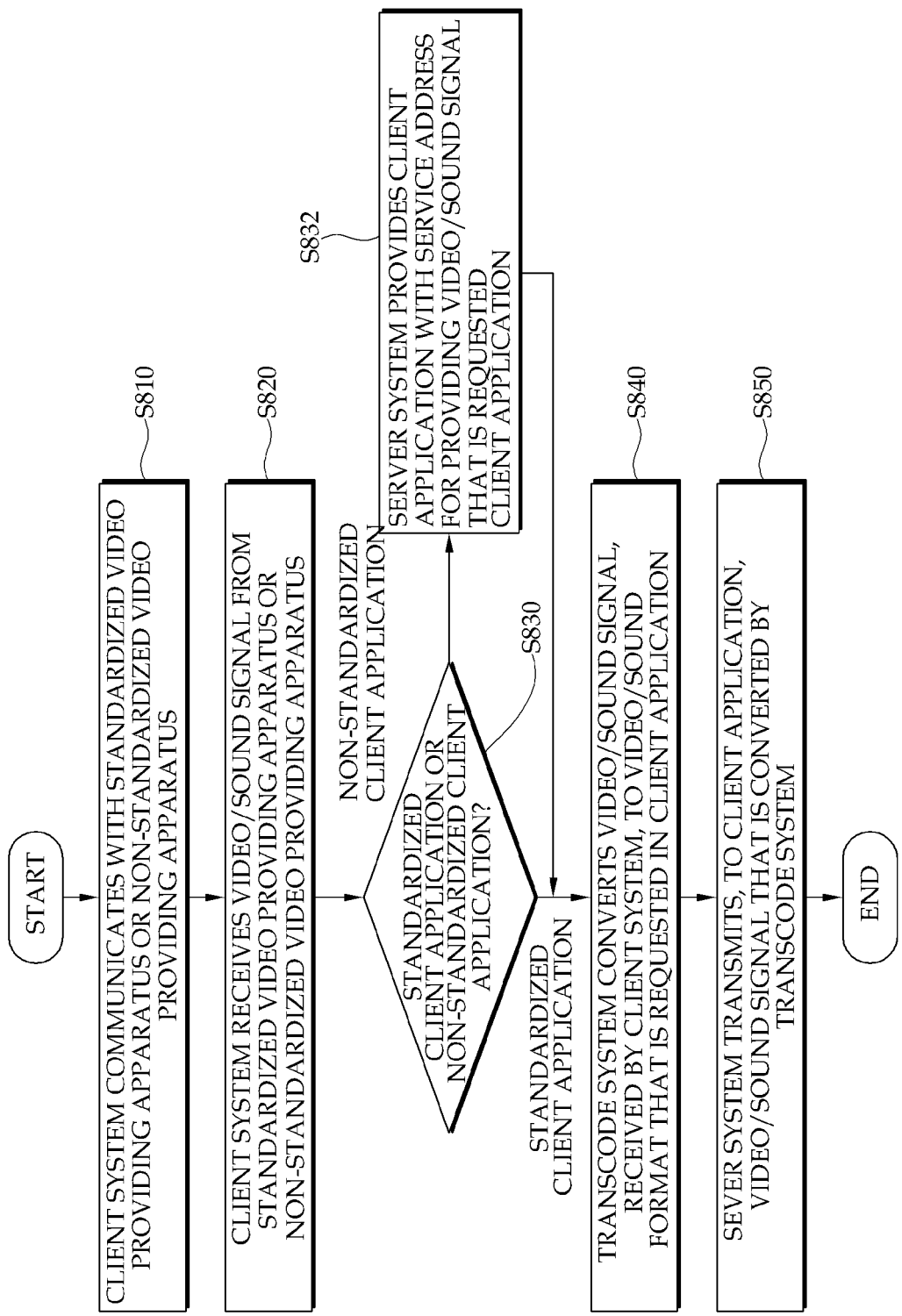
FIG. 8 is a flowchart illustrating a multi-channel video distribution method according to an exemplary embodiment of the present disclosure.

FIG. 8 is a flowchart illustrating a multi-channel video distribution method according to an exemplary embodiment of the present disclosure.

Referring to FIG. 8, in light of FIGS. 2-3, the client system 310 communicates with the video providing apparatus 210 including a standardized video providing apparatus or a non-standardized video providing apparatus (S810). Here, the client system 310 communicates with the non-standardized video providing apparatus via an API.

Next, the client system 310 receives a sound/video signal from the video providing apparatus 210 (S820).

Next, the server system 320 determines whether the client application 230 is a standardized client application or a non-standardized client application (S830).

When the client application 230 is the standardized client application, the transcode system 330 converts the sound/video signal received from the video providing apparatus 210, to a video/sound format that is requested in the client application 230, in response to a request of the client application 230 (S840).

Next, the server system 320 transmits, to the client application 230, the video/sound signal that is converted by the transcode system 330 (S850).

When the client application is determined as the non-standardized client application in operation S830, the server system 320 provides, to the client application 230, a service address for providing the video/sound signal that is requested in the client application 230 (S832) and then sequentially proceeds operations S840 and S850 through communication with the client application 230.

Additionally, even though not illustrated in the figures, the multi-channel video distribution method may further include an operation of storing, by the storage system 340 in the storage 240 as a file format, the video/sound signal that is received from the video providing apparatus 210.

The multi-channel video distribution method may further include an operation of detecting, by the transcode system 330, an event from the video/sound signal received from the video providing apparatus 210 using a predetermined detection algorithm and transmitting the detected event to the client application 230.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A multi-channel video distribution apparatus, comprising:
    a client system to communicate with a standardized video providing apparatus and a non-standardized video providing apparatus, and to receive a video/sound signal from the standardized video providing apparatus and the non-standardized video providing apparatus;
    a transcode system to convert the video/sound signal, received by the client system, to a video/sound format that is requested in a client application, wherein the video/sound signal is transferred to one of the following destinations according to an input of the video/sound signal: a network video client (NVC) in the case of a first input type of the video/sound signal, or an application programming interface (API) in the case of a second input type of the video/sound signal and wherein the transcode system changes a resolution of the video/sound signal according to the request of the client application;
a server system to communicate with the client application, and to transmit, to the client application, the video/sound signal that is converted by the transcode system; and
a server hub configured to maintain a transmission control protocol/Internet protocol (TCP/IP) connection within the multi-channel video distribution apparatus and to perform switching between apparatuses within the multi-channel video distribution apparatus.

2. The apparatus of claim 1, wherein the client system comprises:
a network video client (NVC) module to communicate with the standardized video providing apparatus; and
an application programming interface (API) module to communicate with the non-standardized video providing apparatus.

3. The apparatus of claim 2, wherein the API module includes an API to receive streaming information of a non-standardized format.

4. The apparatus of claim 1, wherein the server system comprises:
a network video transmitter (NVT) module to communicate with a standardized client application; and
a common gateway interface (CGI) module to perform setting and control of the multi-channel video distribution apparatus in response to a command of an operating terminal.

5. The apparatus according to claim 1, wherein when the client application is a non-standardized client application, the server system provides the client application with a service address for providing the video/sound signal that is requested in the client application.

6. The apparatus according to claim 1, wherein the transcode system comprises:
a transcoder module to convert the video/sound signal, received by the client system, to the video/sound format that is requested in the client application.

7. The apparatus of claim 1, wherein the transcode system further comprises:
an analytics module to detect an event from the video/sound signal received from the client system using a predetermined detection algorithm, and to transmit the detected event to the client application.

8. The apparatus according to claims 1, further comprising:
a storage system to store, in a storage, the video/sound signal that is received by the client system, or to read the video/sound signal that is stored in the storage.

9. The apparatus of claim 8, wherein the storage system comprises:
a file manager module to store or read, in or from the storage as a file format, the video/sound signal that is received by the client system.

10. A multi-channel video distribution method, comprising:
communicating, by a client system, with a standardized video providing apparatus and a non-standardized video providing apparatus, the client system configured to receive a video/sound signal from the standardized video providing apparatus and the non-standardized video providing apparatus;
receiving, by the client system, the video/sound signal from the standardized video providing apparatus and the non-standardized video providing apparatus;
converting, by a transcode system, the video/sound signal, received by the client system, to a video/sound format that is requested in a client application, wherein the video/sound signal is transferred to one of the following destinations according to an input of the video/sound signal: a network video client (NVC) in the case of a first input type of the video/sound signal, or an application programming interface (API) in the case of a second input type of the video/sound signal;
transmitting, by a server system, to the client application, the video/sound signal that is converted by the transcode system;
maintaining, by a server hub, a transmission control protocol/Internet protocol (TCP/IP) connection within the multi-channel video distribution apparatus and performing, by the server hub, switching between apparatuses within the multi-channel video distribution apparatus.

11. The method of claim 10, further comprising:
determining, by the server system, whether the client application is a standardized client application or a non-standardized client application; and
providing, by the server system, the client application with the service address for providing the video/sound signal that is requested in the client application when the client application is the non-standardized client application.

12. The method of claim 10, further comprising:
storing, by a storage system, in a storage, the video/sound signal that is received by the client system.

13. The method of claim 10, further comprising:
detecting, by the transcode system, an event from the video/sound signal received by the client system using a predetermined detection algorithm; and
transmitting, to the client application, the event that is detected by the transcode system.

14. A video management system, comprising:
a video providing apparatus comprising at least one of a standardized video providing apparatus and a non-standardized video providing apparatus;
at least one client application configured to request a video provided by the standardized video providing apparatus and the non-standardized video providing apparatus;
a multi-channel video distribution apparatus to communicate with the video providing apparatus, to convert a video/sound signal, received from the video providing apparatus, to a video/sound format that is requested in the at least one client application, and to thereby transmit the converted video/sound signal to the client application, wherein the video/sound signal is transferred to one of the following destinations according to an input of the video/sound signal: a network video client (NVC) in the case of a first input type of the video/sound signal, or an application programming interface (API) in the case of a second input type of the video/sound signal; and
a server hub configured to maintain a transmission control protocol/Internet protocol (TCP/IP) connection within the multi-channel video distribution apparatus and to perform switching between apparatuses within the multi-channel video distribution apparatus.

15. The system of claim 14, wherein the multi-channel video distribution apparatus communicates with the non-standardized video providing apparatus via an API.

16. The system of claim 14, wherein when the client application is a non-standardized client application, the multi-channel video distribution apparatus provides the client application with a service address for providing the video/sound signal that is requested in the client application.

17. The system of claim 14, wherein the multi-channel video distribution apparatus stores, in a storage, the video/sound signal that is received from the video providing apparatus, or converts, to a streaming, the video/sound signal that is stored in the storage in response to a request of the client application and thereby transmits the converted video/sound signal to the client application.

18. The system of claim 14, wherein the multi-channel video distribution apparatus detects an event from the video/sound signal received from the video providing apparatus using a predetermined detection algorithm, and transmits the detected event to the client application.

* * * * *